Jan. 24, 1967 R. R. ROEMER 3,299,634
FLUID PRESSURE OPERABLE DEVICE AND CONTROL DEVICE
Filed May 5, 1965 5 Sheets-Sheet 1

INVENTOR
RALPH R. ROEMER
BY John H. Bimard
his ATTORNEY

INVENTOR
RALPH R. ROEMER
BY
ATTORNEY

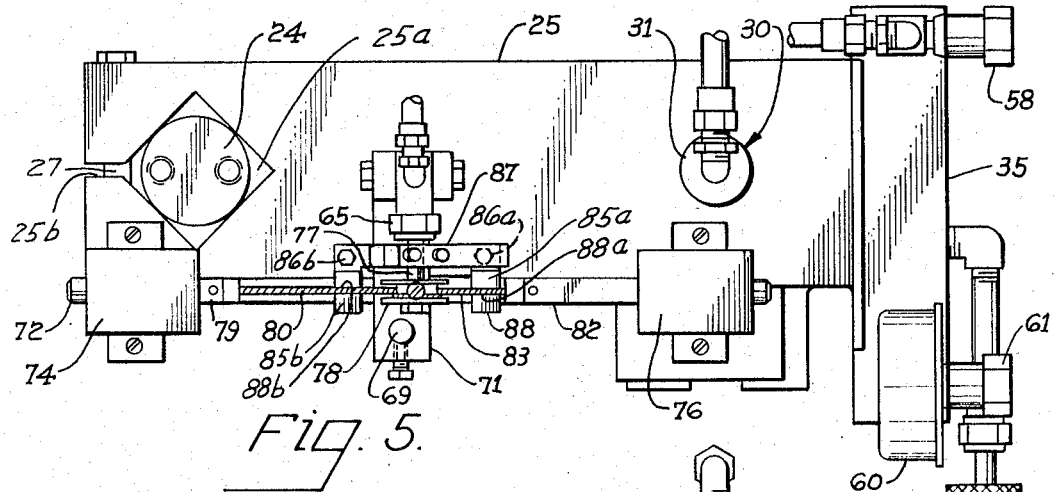
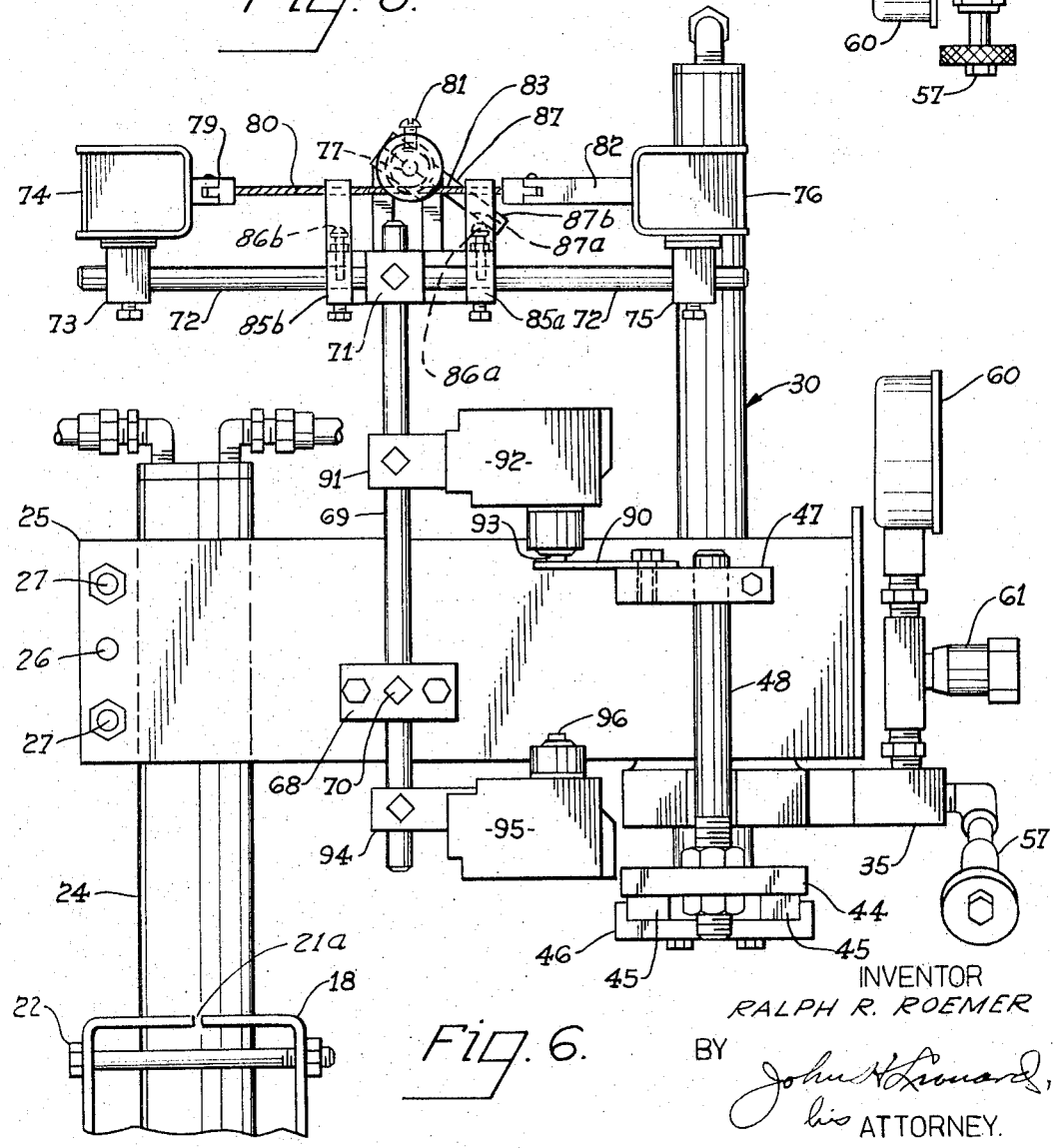

1

3,299,634
FLUID PRESSURE OPERABLE DEVICE AND CONTROL DEVICE
Ralph R. Roemer, 2100 Vega Ave., Cleveland, Ohio 44113
Filed May 5, 1965, Ser. No. 453,447
10 Claims. (Cl. 60—52)

This invention relates to a fluid pressure operable drive and control device, and particularly to a control for a fluid pressure operable drive device which is arranged for driving a pair of members to and fro in fixed paths of reciprocation or oscillation relative to each other. More specifically, the present invention is an improvement on the hydraulic power feed disclosed in my copending application, Serial No. 247,129, filed December 26, 1962, now Patent No. 3,207,008, issued September 21, 1965.

The drive and control device herein is particularly desirable in combination with rotary spindle machines in which the spindles and work supports are moved lineally toward and away from each other, generally by movement of the spindle tool piston and head toward a stationary work table.

For purposes of illustration, the control device is shown herein specifically in connection with the reciprocating spindle of a drill press, as in the above identified application.

In my above copending application, the hydraulic power feed device is one which is controlled manually for effecting the drive of the spindle on its work and return strokes. The present device is settable so as to cause the pressure operable drive to effect either a cycle of operation, including a feed stroke and return, or a repetitive cycle of operation, including repeated and timed feed strokes and returns.

The present device can control these cycles while the various preselected fluid pressures necessary for the type of chip to be produced by the drill are maintained, thus adding to the basic advantages of the structure in the copending application.

Another feature of the present invention resides in the specific structure, whereby a wide range of adjustment of starting position of the tool head and of length of stroke, as well as the timing of the cycles are provided in a very compact arrangement which can meet the various conditions under which the drill press is to operate.

A more specific feature is provision of an adjustable supporting arm which can be mounted on the usual upright post or pedestal of a drill press in different elevated and circumferentially adjusted positions thereon without changes of the drill press structure, and which, in turn, supports an upright tank or reservoir for the fluid of the fluid drive, which tank serves also as a pedestal for a second arm which is adjustable axially and circumferentially thereof and which, in turn, supports the fluid pressure operated drive and parts of the control device which cooperate with the spindle.

Various other features of the invention will become apparent from the following description wherein reference is made to the drawings in which.

2

Figure 1:
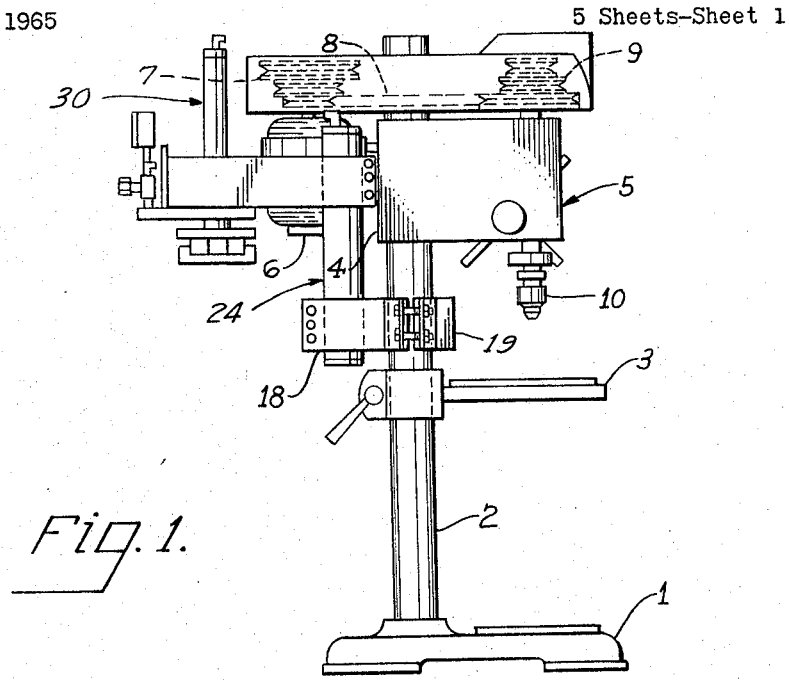
FIG. 1 is a side elevation of a conventional drill press with drive and control device of the present invention installed thereon and moved to inoperative position.
Figure 2:
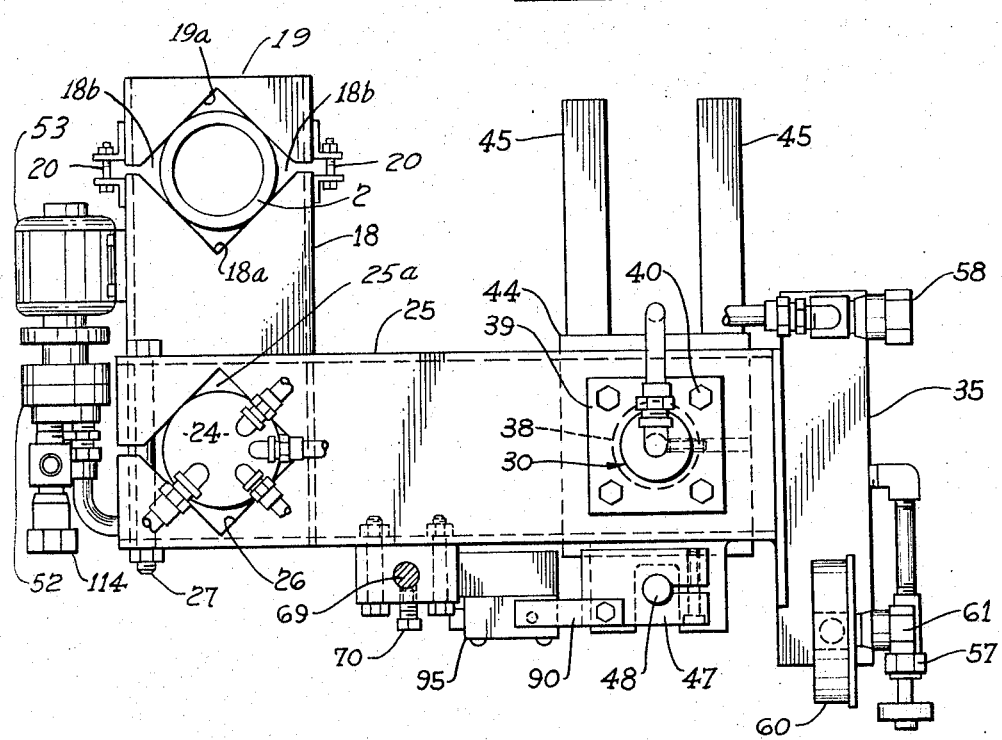
FIG. 2 is an enlarged top plan view of the device of the present invention, showing it installed on a pedestal of the drill press illustrated in FIG. 1 and swung to operative position, the remainder of the press being omitted for clearness in illustration.
Figure 3:
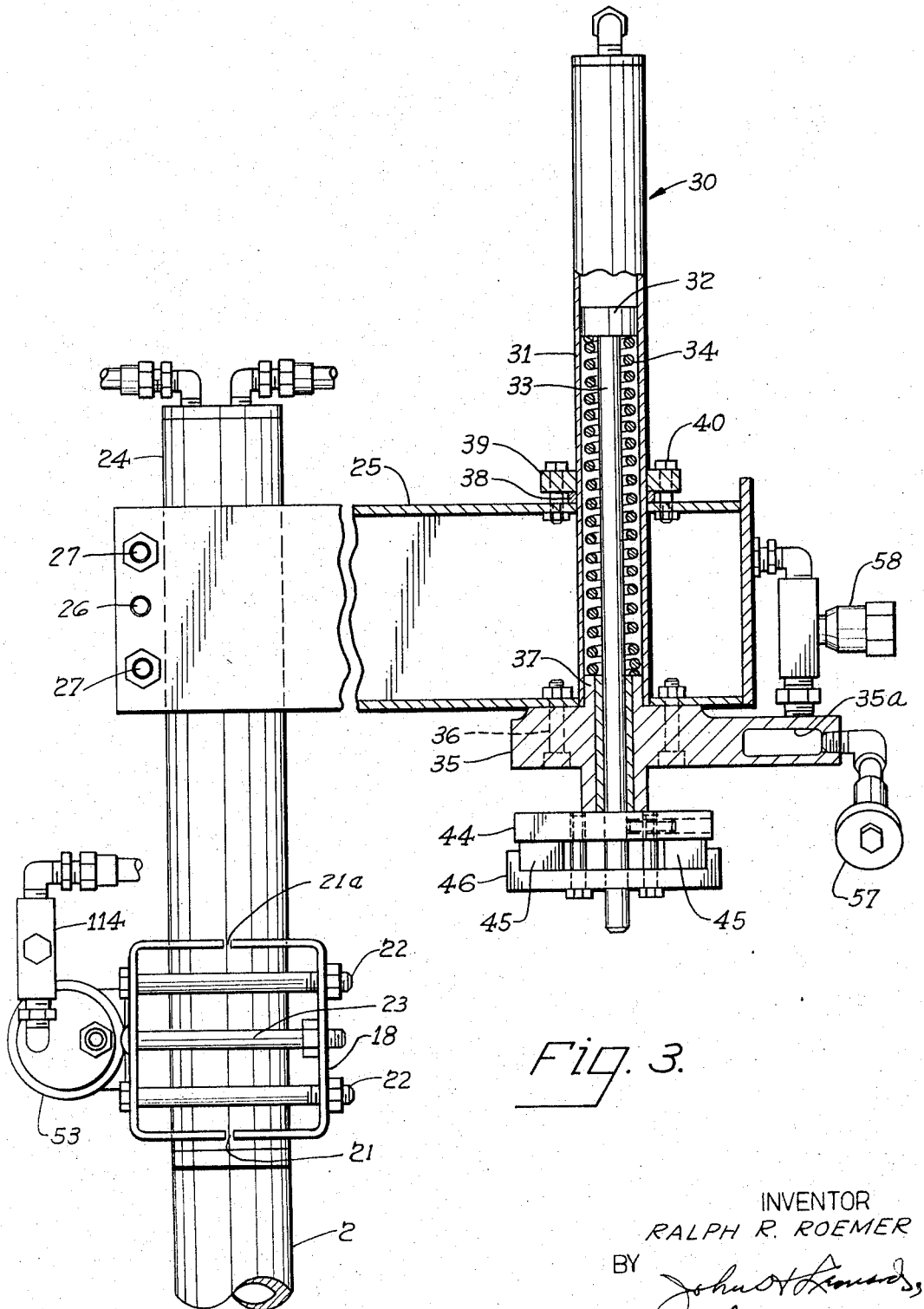
FIG. 3 is a front elevation of the device illustrated in FIG. 2, part thereof being shown in section for clearness and illustration.
Figure 4:
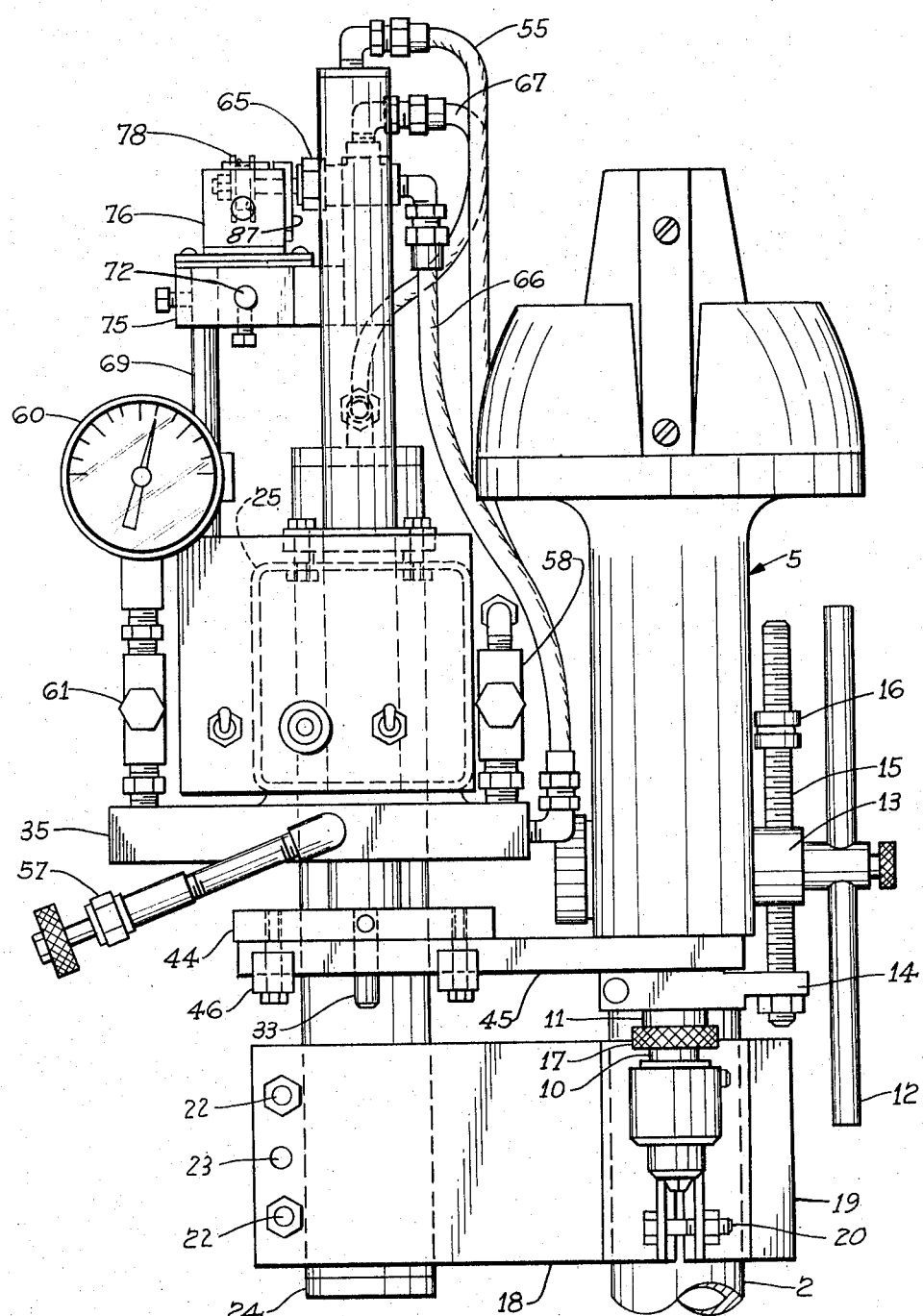
Figure 7:
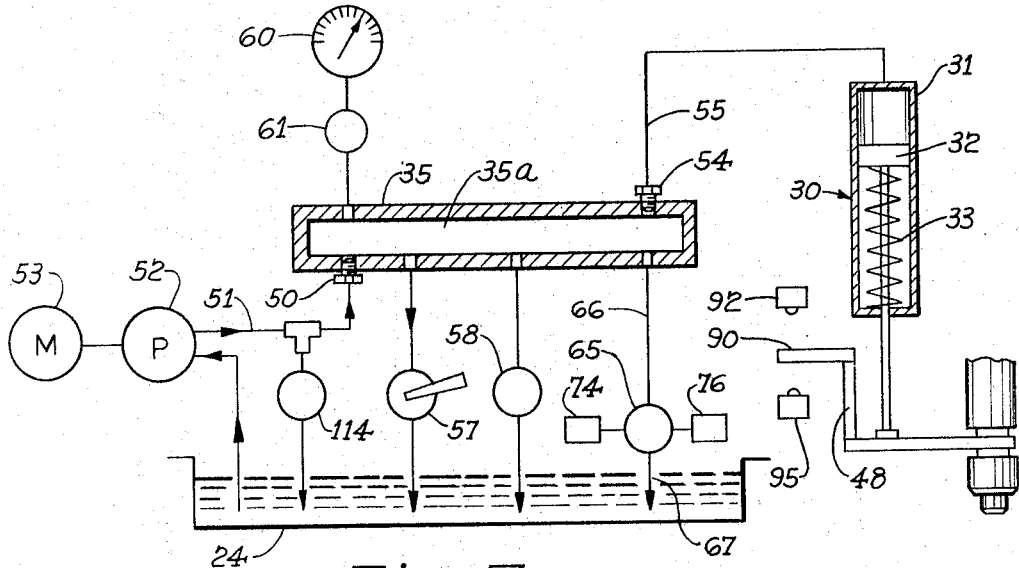
Figure 8:
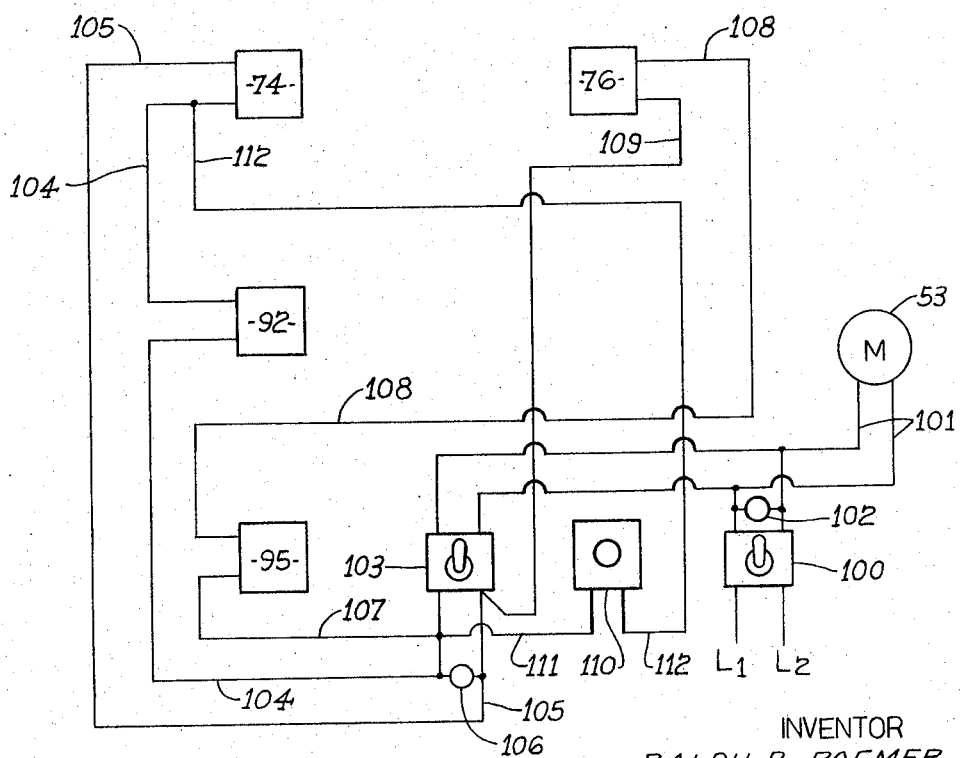

FIG. 4 is an enlarged left side elevation of the driving head and spindle of the drill press, showing the connection between the present device and the drill press spindle;

FIG. 5 is a top plan view of the present device;

FIG. 6 is a front elevation of the structure illustrated in FIG. 5;

FIG. 7 is a schematic showing of the hydraulic circuit and controls of the device; and FIG. 8 is a wiring diagram showing the control system of the present device.

Referring to the drawings, the drill press in connection with which the device of the present invention is shown comprises a base 1 which supports an upright column 2 on which a work table 3 is mounted for vertical adjustment. Mounted on the column 2 above the level of the table 3 is a supporting bracket 4 which supports a spindle head 5 with its spindle axis upright. The bracket 4 also supports an electric motor 6 which, through the usual cone pulley 7, belt 8, and cone pulley 9, drives the rotary spindle 10 of the press at selected speeds.

The spindle 10 is rotatably supported in an upright axially movable, quill or sleeve 11. The quill 11 is supported in the head in a conventional manner for vertical axial movement, and is normally driven on its feeding stroke by a hand lever 12, which is connected to the quill interiorly of the head by a conventional rack and pinion, not shown. The quill is normally yieldably held in the upper retracted or return position by a suitable return spring, not shown, which returns the head to retracted or starting position from all operating positions when the lever 12 is released. The press also has a conventional stop 13 in the form of a boss integral with the head 5. A lock collar 14 is clamped in adjusted position onto the quill and supports a threaded rod 15. An adjustable stop nut 16 is mounted on the rod 15 and is adjustable endwise of the rod 15 and cooperates with the stop 13 for limiting the movement of the quill in the direction of feed to preselected positions.

The quill 11 also carries a lock collar 17.

The drill press above described is of a type readily available on the market and is typical of the smaller drill presses generally in use today.

The present drive and control device is arranged to be applied to such a drill press without requiring any change in the structure of the press, so that the press can be operated manually in the usual manner, or can be operated by the drive and control device of the present invention, selectively as desired.

The drive and control device is arranged to be supported for adjustment to different positions for cooperating with the spindle in various different vertically and circumferentially adjusted positions of the spindle head. For this purpose, a supporting arm 18 in the form of a tube of generally square cross section is employed. The tube 18 has upper and lower notches 18a. A clamp 19 having upper and lower notches 19a is provided and is clamped to the arm 18. The notches 18a and 19a provide a passage 18b. The upright pedestal 2 of the press extends through the passage 18b. The arm is provided with clamping bolts 20 so that the clamp can be drawn tightly in clamping engagement with the pedestal 2 in selected adjusted positions axially and circumferentially of the pedestal 2.

At its opposite or outer end, the arm 18 is provided with an upright opening 21 with a slit 21a extending from the opening 21 to the adjacent end of the arm. Clamping bolts 22 are provided for clamping the arm 18 in supporting relation to an upright auxiliary pedestal. An expanding bolt and nut combination 23 is provided for expanding the opening 21 when the bolts 22 are loosened so that the sleeve 18 can be adjusted axially of the reservoir 24. In the form illustrated, the drive device is to be a hydraulic device requiring a reservoir 24 for a hydraulic fluid, and hence the outer end of the arm 18 is adjustably connected to the reservoir 24 which is preferably cylindrical, and provides the auxiliary pedestal.

Another arm 25, having a passage 25a similar to the passage 18b and having a slot 25b is provided. An expanding bolt 26 and clamping screws 27 are provided. The reservoir 24 is received in the passage 25a and the arm 25 is clamped thereon in preselected adjusted positions axially and circumferentially of the reservoir 24. It can be seen that with this arrangement, by the swinging of the arms 18 and 25 and vertical adjustment thereof, the opposite or outer end of the arm 25 can be positioned in substantially any relation desired with respect to the spindle of the press.

Mounted on the outer end of the arm 25 is a piston and cylinder assembly, indicated generally at 30, which is operable for moving the spindle on its feed and return strokes. In the form illustrated, the assemblage is essentially the same as in my above copending application and comprises a cylinder 31 in which is reciprocable a piston 32 having a rod 33. A return spring 34 is disposed between the piston 32 and the rod end of the cylinder 31 for returning the piston to starting position when the fluid pressure in the head end of the cylinder is reduced. Pressure fluid is supplied to the head end of the cylinder 31 from a manifold 35, having a single internal cavity 35a later to be described in detail.

The manifold 35 is disposed against the underside of the arm 25 and is clamped thereto by suitable bolts 36. The lower wall of the arm 25 has an aperture through which a suitable boss 37 on the upper face of the manifold 35 extends so as to project part way into the inside of the arm.

The cylinder 30 extends through a hole in the top wall of the arm 25 into the inside of the arm, and is open at its lower end for receiving and accommodating the boss 37 with slight radial clearance. The boss 37 partially centers the cylinder while leaving its lower end free to move slightly radially so as to free it from binding stresses due to misalignment. The cylinder is provided with a circumferential shoulder 38. A clamping plate 39 is exposed above the shoulder 38 and bears against the upper face thereof. By means of suitable bolts 40 threaded into the upper wall of the arm 25, the plate 39 is drawn downwardly against the shoulder 38 and forces the lower end of the cylinder firmly against the manifold 35.

The piston rod 33 extends entirely through the bottom wall of the arm 25 and through a passage in the manifold, and at its lower end carries supporting plate 44 which is secured in fixed position axially of the piston rod 33. The plate 44, in turn, carries a pair of yoke arms 45 which are clamped firmly to the underside thereof by suitable clamps 46 in predetermined adjusted positions. The arms 45 are secured in adjusted positions in which they can embrace the quill 11, with radial clearance, at the location just beneath the housing 5 and rest on top of the adjustable clamp stop 14. With this arrangement, upon movement of the piston rod 33 downwardly, the arms 45 move the quill 11 downwardly, thus moving the spindle head on its feed stroke. Upon release, the return spring 34 returns the piston 33 upwardly, thus returning the spindle head on its return stroke. It is to be noted, however, that generally a return spring is provided in the spindle head itself, in which case such a spring can serve as a return means for the piston 32, if desired.

The plate 44 also carries an adjustable clamp stop which can be used in lieu of its stop provided by the boss 13, rod 15 and nut 16. This adjustable stop, being directly on plate 44, and fastened directly on the piston rod 33, can be used to protect the stops on the drill press itself from stresses occasioned by the hydraulic feed. This adjustable stop comprises a rod 48 fixedly secured on the plate 44 and carrying an adjustable clamp 47 which is adapted to engage the upper face of the manifold 35 for limiting the movement of the piston on its feed stroke, depending upon the adjustment of the clamp 47 along the rod 48.

The hydraulic circuitry is best illustrated in FIG. 7. Pressure fluid is supplied into the cavity 35a of the manifold 35 through an inlet fitting 50 which is connected by a pipe line 51 to a hydraulic pump 52 driven by a motor 53. The manifold cavity 35a is connected by a fitting 54 to a supply line 55 which, in turn, is connected to the head end of the cylinder 31. So long as other outlets from the cavity of the manifold are closed, the pressure fluid is passed directly to the cylinder 31 for driving the piston 32 on its feed stroke. For manually controlling the starting and stopping of the piston, a manually operated needle control valve 57 is provided. The valve 57 has its inlet connected to the cavity 35a of the manifold 36 and its outlet connected to the reservoir 24. By closing the valve 57, the pressure builds up in the cavity 35a to the operating pressure required for driving the piston on the feed stroke. Opening the valve 57 causes the pressure in the manifold to become reduced to such an extent that the spring 33 returns the piston on its return stroke. The manual control valve 57 is a normally open valve and is closed to effect hydraulic drive of the drill on its feed stroke by the piston and cylinder assemblage.

The rate of feed of the drill is determined, in the first instance, by the operator by observing the chips. The present device is such that, having determined and adjusted the rate of feed, the device maintains this rate. For this purpose, a needle valve 58 is provided. The valve 58 is connected to the manifold cavity 35a at its inlet side and discharges into the reservoir 24. By observing the chip and adjusting the valve 58, the proper rate of feed can be selected, after which the valve 58 is left in its adjusted position. Thereafter, by opening and closing the valve 57, the starting and stopping of the feed is effected, and the proper rate of feed is maintained by the valve 58.

It is important to know at what pressure this rate of feed is obtained so that, instead of relying upon the visual setting of a needle valve 58, one can adjust it in accordance with the pressure in the manifold. This is advantageous also because during changes in temperature and the like of the fluid, the pressure is apt to vary due to expansion, contraction, frictional flow, and the like. Therefore, reliance is placed on an indicating pressure gauge 60 which is connected to the manifold and at all times reflects the effective pressure therein. An adjustable damping needle valve 61 is interposed between the manifold and the gauge 60 to reduce flutter of the gauge while allowing a prompt and accurate reflection of the pressure in the manifold.

Thus, in operation, the operator observes the chips and adjusts the valve 58 to provide the chip desired, then observes the gauge 60. Thereafter, if he wishes to duplicate the operation, he can merely adjust the valve 58 to bring the pressure of the manifold, as reflected by the gauge, to the pressure at which the satisfactory chip was obtained.

With the structure thus far described, it is apparent that manual operation of the control device for starting and stopping and a pre-selected rate and pressure of application of a drill can be effected. However, as was mentioned, it is desired in many instances that the drill be operated either on a single cycle or a repetitive cycle. For that purpose, the structure now to be described is provided, as best illustrated in FIGS. 4, 5, and 6.

An automatic control valve 65 has its inlet connected by a pipe line 66 to the manifold cavity 35a, and its outlet connected by a pipe line 67 to the reservoir 24. The valve 65 is a needle valve, as distinguished from a merely On and Off valve, so that very accurate control and smooth operation can be obtained. The valve 65 is such that when it is sufficiently opened, it by-passes the fluid from the manifold 35 to such an extent that the pressure fluid supplied to the head end of the cylinder 31 is insufficient to drive the piston 32 on the feed stroke. When fully closed, of course, the pressure in the manifold builds up to the maximum to be supplied for the particular feed, which is adjusted by the setting of the valve 58.

In order to operate the valve 65 in relation to the positions of the piston 32, a suitable supporting bracket 68 is mounted on the one side of the arm 25 and supports an upright rod 69. The rod can be adjusted vertically relative to the arm 25 and secured in an adjusted position by a lock bolt 70.

On the upper end of the rod 69 is a supporting bracket 71 which supports a transverse rod 72. Mounted on one end of the rod 72 by the medium of a bracket 73 for adjustment endwise of the rod 72 is a solenoid 74. Mounted on the other end of the rod 72 by a bracket 75, which is adjustable endwise of the rod 72, is a solenoid 76. The valve 65 is provided with a stem 77 on which a drum 78 is mounted in coaxial relation and for rotation with the stem 77. The solenoid 74 has a plunger 79 which is connected to a cable 80 which is wound about the drum 77 and secured thereto at its inner end by a screw 81. The solenoid 76 has a plunger 82 which is connected to a cable 83 which is also wound about the drum and secured thereto at its inner end by the screw 81. If desired, the cables 80 and 83 may be a single cable wound a number of loops about the drum and secured at its midportion by the screw 81.

When the solenoid 74 is energized, it rotates the stem 77 clockwise to close the valve 65. When the solenoid 76 is energized, on the other hand, it rotates the stem 77 counterclockwise to open the valve 65. It is well known that solenoids operate with considerable speed and force and, therefore, there is danger that in closing the valve the needle will be jammed on its seat so tightly by the operation of the solenoid 74 that solenoid 76 will be unable to break it loose for opening. Furthermore, it may be the valve is one which, in moving to open position, may jam so that the solenoid 76 cannot break it loose and start it in the opposite direction due to frictional binding.

In order to prevent such jamming, an adjustable stop bracket 85a is mounted on the rod 69 for movement to adjust positions endwise thereof and carries at its upper end an adjustable abutment 86a in the form of a bolt. Mounted in clamped position on the stem 77 for adjustment circumferentially thereof is a radial stop arm 87. The arm 87 swings with the stem upon rotation of the stem. The arm has opposite face portions 87a and 87b. The face portion 87a is positioned to engage the abutment 86a where the valve stem is rotated clockwise. Thus the rotated position of the valve in the clockwise or closing direction is determined by the position of the abutment 86a which is set to prevent rotation of the stem by the closing solenoid 74 just as the needle seats and before it is stressed down so tightly against the seat as to bind. As a result, the valve 65 can readily be broken loose and opened by the solenoid 76. A similar stop bracket 85b may be provided arranged with an adjustable abutment 86b for engagement with the opposite face 87b of the arm 87. By adjusting the stop 86b, the rotation of the valve stem in a counterclockwise direction is controlled and thereby the degree of opening of the valve. This has an advantage in that it permits adjustment of the rate of return of the spindle.

The adjustable stop brackets 85a and 85b have slots 88a and 88b, respectively, at the top through which cables 80 and 83 extend, respectively. The notches 88a and 88b act as guides for the cables. Also, by the engagement of the stops 85a and 85b with the adjacent ends of the plungers 79 and 82, respectively, the solenoid plungers are prevented from being thrown out of their coils.

In order to energize the plungers in the proper relation to the position of the piston and tool, a switch operating finger 90 is mounted on the clamp 47 which is adjustable on rod 48 for movement parallel to the rod 69. Mounted on the rod 69 for movement to adjusted positions therealong, is a bracket 91 which carries a switch 92 having a push button 93. Also mounted on the rod is a lower bracket 94 which carries a switch 95 having a push button 96. The switches are positioned so that the push buttons 93 and 96 lie in the path of the finger 90 and are engaged thereby as the finger is moved upwardly and downwardly, respectively, to predetermined positions. The switch 92 is connected to the solenoid 74 and when closed by engagement of the rising finger 90 with the push button 93 energizes the solenoid 74 to move the valve 65 to closed position. The switch 95 is connected to the solenoid 76 and when operated by the lowering finger 90 energizes solenoid 76 to open valve 65. As mentioned, closing the valve causes pressure in the manifold 35 and cylinder 31 to build up, forcing the piston 32 on its downward or the feed stroke, whereas opening of the valve 65 reduces the pressure in the manifold 35 below operating pressure so that the spring 33, or the return spring of the drill press, returns the piston 32, and therefore the spindle, to starting position.

Assuming that the switch 92 is in position to be engaged and operated by the finger 90 when the piston returns and the switch 95 is in position to be engaged and operated by the finger 90 when the piston 32 reaches its predetermined extended position on the feed stroke, then, to provide a repetitive cycle, it is necessary only to close the normally open manual valve 57. Thereafter the cycle is repeated due to solenoid operation of the valve 65. For example, if the piston lowers, the finger 90 operates the switch 95 to energize the solenoid 76 which opens the valve 65. The pressure in the cylinder 31 and manifold 35 thereupon drops and the spring 33 returns the piston to starting position. However, when the piston reaches starting position, the finger 91 operates the switch 92 to energize the solenoid 74, thereby closing the valve 65, so that pressure builds up in the manifold and head end of the cylinder 31 and forces the piston on its feed stroke.

Referring to FIG. 8, wherein electric circuitry is shown, electric power is supplied by the usual power source, indicated by conductors $L_1$ and $L_2$. A toggle switch 100 is provided which, when turned on, connects the motor 53, through lines 101, to the source of power. A pilot indicating light 102 is connected across the lines 101 for indicating when the power is on. Lines 101 lead to a toggle switch 103. Beyond the switch 103 are power lines 104 and 105. A pilot light 106 is connected across the lines 104 and 105 to indicate when they are energized. The line 104 leads to one side of the switch 92, the opposite side of which is connected to the solenoid 74 by a line 105 so that, when the switch 92 is closed, it causes closure of the valve 65 by the solenoid 74, thereby causing the piston to be driven on the feed stroke. When the valve 65 is opened, the micro switch 92 is opened and deenergizes the solenoid 74. A line 107 is connected to the line 104 and to one side of the switch 95. A line 108 is connected to the opposite side of the switch 95 and leads to one side of the solenoid 76. The opposite side of the solenoid 76 is connected by a line 109 to the line 105. With this arrangement and connections, a repetitive cycle is obtained providing both switches 92 and 95 are positioned in operating position along the rod 69. However, for an individual cycle, it is necessary to close the valve 65 by hand and energize the solenoid 76 when the piston reaches the end of its return stroke, even though the switch 95 is not operated. For this purpose, a push button switch 110 is provided and is connected by a line 111 to the line 104 at one side, and by the line 112 to the solenoid 74 in bypassing relation to the switch 92. When, for a single cycle, the piston 32 is driven downwardly, it closes the switch 95 which then energizes the solenoid 76 and thereby opens the valve 65 and permits the return stroke. To close the valve 65, however, to provide for manual operation on another cycle, the push button 110 is operated to energize the solenoid 76 to close valve 65, whereupon the system is under manual control for starting the next cycle.

It happens, however, that sometimes a single cycle is desired wherein the operator closes the manual valve 57 and the device drives a spindle on the feed stroke and return stroke and then stops. If such is desired, all that is necessary is to adjust the switch 92 upwardly beyond its operating position on the rod 69. Unless push button 110 is actuated to close the valve 65, no pressure can build up, as both valves 65 and 57 must be closed to cause a build-up of pressure. Upon actuating the push button 110 to close the valve 65, since the valve 57 has already been closed, pressure builds up at the head end of the cylinder 31, and the piston is driven downwardly on the feed stroke until the finger 90 operates the switch 95, which causes opening of the valve 65 by the solenoid 76. When the valve 65 is opened, the piston returns. For an additional cycle, it is necessary only to operate the switch 110 for energizing the solenoid 74 to close the valve 65 and thereby starting the next cycle.

It is desirable, in all instances, that the structure be protected from an excessive build up of fluid pressure. For example, this may be necessary to prevent bending or warpage of the parts or breakage of drills and the like because of erratic operation by the operator, or because some valve has become stuck or becomes inoperative. For this purpose a maximum presure needle valve 114 is provided. The valve 114 is adjustable and is connected to the discharge side of the pump in parallel with the manifold 35. The valve 114 is adjusted for a maximum pressure for the general type of stock to be drilled, and thereafter is not touched until a different stock or operation is desired. It operates to bypass a certain amount of fluid from the pump to assure a continuous flow of fluid at all times to prevent heating and overloading of the pump, and also to prevent the build up of excessive pressure. The maximum safe pressure is adjusted to an amount somewhat above the maximum operating pressure which is to be allowed during a particular type of work, for driving the piston on its feed stroke.

Thus, in operation, a maximum safe selected pressure cannot be exceeded under any conditions, and below this maximum safe selected pressure, a maximum operating pressure and a minimum operating pressure are selected. The maximum operating pressure usually is determined by the setting of the valve 58 which determines the rate of feed. However, should someone accidentally close the valve 58 while the stop and start valve 57 is closed, then there is a chance that the pump and other parts could be subjected to an undue buildup of pressure, except for prior setting of the valve 114.

Having thus described my invention, I claim:

1. A fluid pressure operable drive device for driving a pair of members relative to each other and comprising
   a cylinder adapted for connection to one member;
   a piston reciprocable in the cylinder and adapted for connection to the other member, a continuously driven pump;
   a hydraulic fluid pressure conducting circuit connected to the cylinder at one side of the piston and connected to the discharge side of the pump for transmitting to said side of the piston fluid at operating pressure for driving the piston in one direction relative to the cylinder on its power driving stroke;
   a control valve connected in said circuit and operable when open to discharge pressure fluid therefrom and thereby cause the pressure in said one end of the cylinder to fall below operating pressure, and operable when driven a predetermined distance in the closing direction to cause the pressure in said one end to increase to operating pressure;
   control means operatively connected to the piston and driven thereby when the piston moves in said one direction;
   valve operating means render operative by operation of said control means when the piston has moved to a predetermined position in said one direction on its power stroke to open said valve sufficiently to reduce pressure below operating pressure;
   and means to return the piston to its starting position when the pressure falls below operating pressure;
   said valve operating means comprises a power driven means drivingly connected to the valve for opening the valve when the power driven means is connected to a source of power, a control device operable to connect and disconnect the power driven means to the source of power and rendered operative by the control means to connect the power driven means to said source when the piston has moved to said predetermined position.

2. A device according to claim 1 wherein said valve is a rotary valve having a rotatable operating stem;
   the valve operating means includes a drum connected to the stem for rotating the stem to open the valve when the drum is rotated in one direction of rotation, a flexible cable wound on the drum for rotating the drum in a direction to open the valve when the cable is moved endwise in an unwinding direction;
   and means to move the cable endwise in the unwinding direction when the valve operating means is rendered operative.

3. A device according to claim 2 wherein the valve is a needle valve.

4. A device according to claim 3 wherein the device includes a stop, abutment means are connected to the valve stem for rotation therewith and are engageable with the stop when the stem is rotated in valve closing direction to a predetermined position, and said stop is positioned relatively to the abutment means to be engaged thereby and stop the valve when the valve moves into closed position sufficiently tightly to stop the flow of pressure fluid therethrough while the valve remain free from substantial binding stresses resisting its rotation toward open position.

5. A device according to claim 1 wherein the power driven means comprise a solenoid and the control device is a switch operative when closed to connect the solenoid to a source of voltage.

6. A device according to claim 1 wherein the operative connection of the control means and piston is such that the control means is also driven by the piston in the opposite direction when the piston returns;
   a second valve operating means is provided and is rendered operative by the control means, when the control means is driven in said opposite direction to a predetermined position, to close said control valve sufficiently to cause the pressure of the fluid in said one end of the cylinder to increase to operating pressure, whereby a continuously repeated cycle can be obtained.

7. A device according to claim 6 wherein settable means are provided for rendering the first mentioned control means and valve operating means inoperative and operative, selectively, with respect to each other.

8. In a fluid pressure operable drive device for driving a pair of members relative to each other;
   a cylinder adapted for connection to one member;
   a piston reciprocable in the cylinder and adapted for connection to the other member;
   a fluid pressure conducting circuit connected to the cylinder at one side of the piston and adapted for connection to a source of fluid at operating pressure for driving the piston in one direction;
   means to return the piston in the opposite direction;
   control valves means for controlling the movement of the piston;
   a motor driven pump having an outlet connected to said conducting circuit and having an inlet;
   a first support element;

a tubular reservoir carried thereby and having its axis upright;

an arm element supporting the cylinder;

means exteriorly of the reservoir and connecting the reservoir and at least one of said elements for adjustment to different relatively rotated positions about the axis of the reservoir and for adjustment of at least one of the elements to different relative positions in a direction endwise of the axis of the reservoir; and means connecting the inlet of the pump to the reservoir.

9. In a fluid pressure operable drive device for driving a pair of members relative to each other;

a cylinder adapted for connection to one member;

a piston reciprocable in the cylinder and adapted for connection to the other member;

a fluid pressure conducting circuit connected to the cylinder at one side of the piston and adapted for connection to a source of fluid at operating pressure for driving the piston in one direction;

control valve means movable to On and Off positions for controlling the movement of the piston;

solenoids connected to the valve and operative, when energized, to open and close the valve, respectively;

control means driven by one of said members in a predetermined path;

a support carried by the other member;

a pair of switches adjustably mounted on said support for independent movement to different adjusted positions relative to each other and each to different adjusted position along and lengthwise of said path, wherein each switch can be engaged and operated by the control means in different positions of the control means along said path, and can be moved out of said path, selectively.

10. A device according to claim 4 wherein the device includes an adjustable stop, and the abutment is engageable with the adjustable stop in the adjusted positions of the adjustable stop when the stem is rotated in valve opening direction for controlling the rate of return of the spindle.

References Cited by the Examiner
UNITED STATES PATENTS

| | | | |
|---|---|---|---|
| 2,122,899 | 7/1938 | Towler et al. | 60—52 |
| 2,192,778 | 3/1940 | Stacy | 41—400 X |
| 2,196,522 | 4/1940 | Davis | 60—52 |
| 2,324,727 | 7/1943 | Shartle | 60—52 |
| 2,374,909 | 5/1945 | Williams | 60—52 |
| 2,399,294 | 4/1946 | Ray | 60—52 |
| 2,475,304 | 7/1949 | Bariffi | 60—52 X |
| 2,763,191 | 9/1956 | Wells | 91—2 X |
| 2,984,985 | 5/1961 | Mac Millin | 60—97 |
| 3,186,306 | 6/1965 | Schorn | 91—27 |

EDGAR W. GEOGHEGAN, *Primary Examiner.*